April 9, 1940.   E. T. OPPERMAN   2,196,398
TIRE CROSS CHAIN CONNECTOR
Filed June 27, 1939
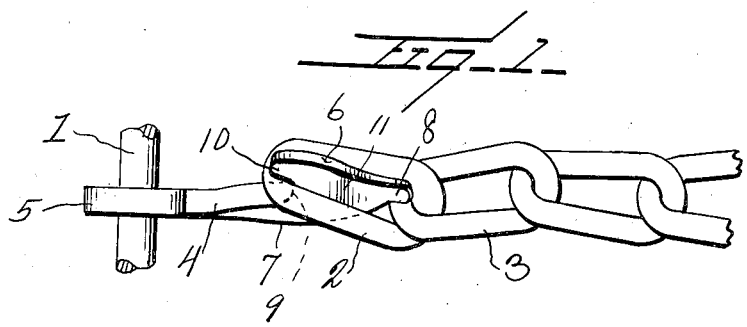
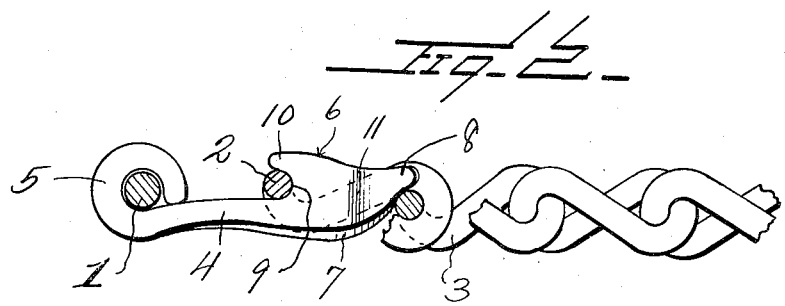
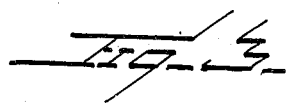
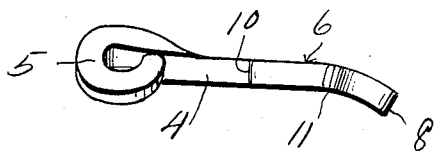
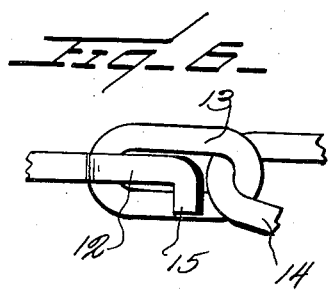
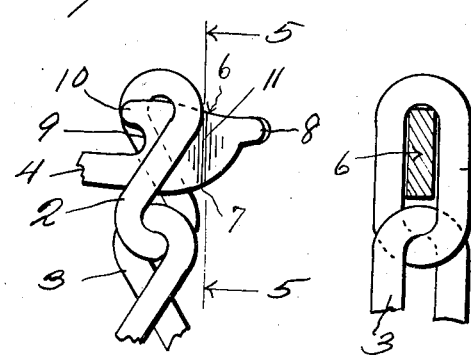
Inventor
E. T. Opperman
By Watson E. Coleman
Attorney Patented Apr. 9, 1940

2,196,398

UNITED STATES PATENT OFFICE 2,196,398

TIRE CROSS CHAIN CONNECTOR

Eugene T. Opperman, Pittsburgh, Pa.

Application June 27, 1939, Serial No. 281,468

5 Claims. (Cl. 59—93)

This invention relates to anti-skid devices for vehicle tires and pertains particularly to an improved connector for use in joining the cross chains of a tire skid chain with the side wall chain.

The present invention has for its primary object to provide a novel form of connector for coupling cross chains with a side wall chain link which is so designed that it may be readily applied to the side wall chain without the use of special tools and which is novelly designed so that it may be readily coupled with an end link of a cross chain to hold the same securely in position solely as a result of the pulling connection which it has with the link.

Another object is to provide a tire chain connector which is so designed as to be compact and light, strong and durable so as to positively maintain the cross chain in the desired position, and of a character whereby when in use it will not produce any noise.

Still another object is to provide a cross chain connector for tire chains which may be applied or put on easily and quickly and also readily removed when a link of the cross chain becomes broken so as to facilitate the easy and quick replacement of such cross chain.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view illustrating in plan the connector embodying the present invention joining an end of a cross chain with a side wall chain.

Fig. 2 is a view in side elevation of the connector unit as illustrated in Fig. 1 with the first two links of the cross chain broken away.

Fig. 3 is an edge view of the connector per se.

Fig. 4 is a view illustrating the manner of coupling the connector with a chain link.

Fig. 5 is a section on the line 5—5 of Fig. 4.

Fig. 6 is a view illustrating a modified form of the connector tip.

Referring now more particularly to the drawing, the numeral 1 designates a link of a side wall chain of an anti-skid chain structure for tires. It is well known that such chain structures have inner and outer side wall chains and cross connecting short chains which are made up of a number of twisted chain links such as are here shown and indicated by the numerals 2 and 3.

The connector embodying the present invention comprises an elongated steel body 4 which is slightly longitudinally curved so that it will approximately fit the curvature of the tire casing side wall against which it is to position. At one end the body 4 is turned to form an eye 5 which is only closed after it has been engaged with a link of the side wall chain 1. By this it is meant that when the connectors are furnished for use, this eye will be open and the metal of the body is to be of such character that the eye may be readily bent into closed position after the side wall chain link has been engaged therein.

At the opposite end of the body 4 there is formed the head 6 which is in the form of a relatively wide flat plate and which has its forward under edge rounded as indicated at 7, this rounded portion extending across the body portion 1, as shown, and terminating in a blunt nose 8 which is directed longitudinally of the connector away from the eye 5. The under edge of this nose 8 is shaped to rest across a portion of the link of the cross chain as will be hereinafter described.

At the inner end of the head 6 there is formed the recess 9 which is designed to receive a portion of a link of the cross chain, the outer side of the recess being defined by the short tip 10 which is of such length that it will not extend entirely across the body of the link which is engaged in the recess, thus avoiding the possibility of this tip being bent in such a manner as to partially encircle the link which it engages and thereby form a locking connection with such link. If this should occur as a result of forming the tip 10 too long, it will be readily seen that difficulty would be experienced in detaching the connector from the link of the cross chain when it becomes necessary to remove the connector for any reason, such, for example, as the replacement of the cross chain.

The width or height of the head 6 is slightly less than the interior area of a link with which it is to be connected when such link has another link connected therewith. In other words, the distance between an end of a link of the cross chain, for example, between the end of the link 3 and the opposite end of the space in the link 2 in which a portion of the link 3 is positioned, is only slightly greater than the height or width of the head 6. This permits the smooth extension of the head 6 through the end link of the cross chain when the connector is disposed substantially at right angles to the length of the first or end link 2.

The body 4, between the head 6 and the eye 5 is torsionally twisted approximately 30° so that by thus offsetting the head with respect to the eye, the connector when joined with the end link 2 of a cross chain will position itself so that the eye 5 will be in a plane perpendicular to the side wall link to which it is attached. This eliminates any side strain on the eye and on the head when the chains are in use.

It will be noted that the nose 8 is curved slightly longitudinally approximately in the part 11 where it joins the head so as to bring the point of the nose into line with the eye 5 when viewing the connector from an end. This slight lateral curvature of the nose permits the nose to conform properly to the curvature of the portion of the end link 2 with which the head is coupled, thus giving a close connection between the head and the link through which the head is extended and permitting the nose 8 to rest upon the end of the second link, the link 3, of the cross chain when the connector is coupled with the cross chain.

It has previously been stated that the under edge of the body 4 is longitudinally curved to conform to the curvature of the tire wall but another important feature of this curve resides in the fact that it pitches the head into a position to fit more snugly into the end link when the chains are mounted on a tire.

The connection of the connector with an end link is accomplished by holding the link 2 vertically and then extending the nose 5 through the opening of the end link, the movement of the connector being in a line perpendicular to the length of the link. The head 6 will pass freely through the opening of the end link and after it has passed to the position where the free end of the end link 2 has moved beyond the inner end of the tip 10, the end link is permitted to drop onto the body 4 whereupon by pulling the link into the recess 9, the link will straighten out and the nose 8 will be brought to rest upon the adjacent end of the second link, the head of the connector extending through the longitudinal center of the opening of the end link. As soon as the end link has passed the end of the tip 10, the parts will automatically couple themselves together as it will be readily apparent that upon releasing the end link, it will immediately slide into the recess 9 and by then applying a pull to the connector and cross chain, the parts will straighten out to couple the connector head and first two links of the cross chain together in the manner described and as shown in the drawing.

The accidental separation of the end link of the cross chain from the connector device is absolutely prevented because of the fact that the free end part of the end link has no support and it, therefore, constantly hangs at a small or no angle to the longitudinal axis of the connector and since the end link and the connector must be in right angularly related positions before they can be uncoupled, it will be readily seen that it will be impossible for them to ever accidently assume this relation while the chain is applied to a tire.

When a link of the cross chain breaks as a result of wear, the connector devices at the ends of the cross chain will tend to turn or rotate on the links of the side wall chains to which they are attached so as to move their free ends away from the tire side wall or, in other words, they will tend to fall outwardly away from the tire side wall. Naturally, each connector device will have attached to it or will carry a portion of the broken cross chain. As the wheel on which the chain is mounted turns, the end link of each broken section of the cross chain will turn over in the area of the connector body between the tip 10 and the eye 5. Thus when the connectors are turned on the tire to a position where the edges 7 will be directed upwardly, the link of the cross chain fragment joined to the connector will tend to slide toward the free end of the connector and as the connector continues to turn, the link will slip off of the end, thus releasing the broken section of chain.

From the foregoing, it will be readily apparent that the connector embodying the present invention is of relatively simple construction, may be strongly and durably made and also may be easily and quickly connected with the side wall chain and cross chain or disconnected from the same as may be necessary with a minimum of effort and without the employment of special tools.

In Fig. 6, a slight modification is shown of the structure of the head of the connector. In this modified form the head is generally indicated by the numeral 12 and the first and second links of the cross chain are designated 13 and 14, respectively. The head 12 is of the same construction as the head 6 and terminates in a nose 15, but in this particular form, the nose 15 is sharply laterally bent so that instead of resting upon the adjacent end of the second link 14, it will rest beside the end of this link upon one side of the first link 13. In this construction, the entire connection between the connector and cross chain is with the first link only.

In the use of a connector of this type, an operator of a car may, upon discovering a broken cross chain, first bring the car to a stop at a point which locates the fragments substantially midway between the road surface and the bottom of the fender. The operator can then reach around under the fender to the inside wall of the tire and by the use of one hand only locate the end link of the broken chain section and turn this link with the one hand to the position where it may be slipped off of the connector. At the same time he may, by the use of his other hand, be removing the end link of the other broken chain section from the outer connector. In attaching a new cross chain, the connection of one end link with the inner connector may also be made by the use of one hand, and when the outer end of the cross chain is connected with the outer connector, one hand will be used to hold the outer end link in the proper position while the other hand manipulates the outer connector to slip it through the outer end link, thus completing the hookup of the cross chain. It will be readily obvious from the foregoing description and upon an examination of the drawing illustrating the connection of one end of the cross chain with a connector of one side wall chain, that only a slight amount of slack in the side wall chain is necessary in order to accomplish the connection or disconnection of the outer connector with the end link of a cross chain.

By making the body of the eye 5 of the connector of sufficient thickness, it will prevent the links coupled to the ends of the side wall chain link with which it is directly connected from slipping past it upon the link to which the eye is attached and thus the eye will operate to prevent the links coming out of position, thereby greatly facilitating the straightening out of the tire chain when it is to be placed on a tire for use.

What is claimed is:

1. A connector for attachment between a cross chain and a side wall chain of an anti-skid unit, comprising an elongated body formed at one end for attachment to the side wall chain, said body at its other end having a flat elongated head which has a width greater than half the inside length of a link of the cross chain whereby the entire head may be passed through an end link in one movement only when the head is extending transversely to the link, said head terminating at one end in a nose and at its other end in a tip which is directed toward the side wall chain and spaced from the body of the connector to form a receiving recess for said end link, said head being of such length that when the end link of the cross chain is engaged in said recess the said nose of the connector will be located adjacent the end of the link remote from the recess to extend over and rest upon the top of a link of the cross chain.

2. A connector for attachment between a cross chain and a side wall chain of an anti-skid unit, comprising an elongated body formed at one end for attachment to the side wall chain, said body at its other end having a flat elongated head which has a width greater than half the inside length of a link of the cross chain whereby the entire head may be passed through an end link in one movement only when the head is extending transversely to the link, said head terminating at one end in a nose and at its other end in a tip which is directed toward the cross chain and spaced from the body of the connector to form a link receiving recess, said head being of such length that when the end link of the cross chain is engaged in said recess the said nose of the connector will extend over and rest on the top of a link of the cross chain, said connector having its body portion torsionally twisted whereby the head will be disposed longitudinally of the central part of the cross chain end link while the opposite end of the connector may maintain a perpendicular relation with an attached side wall chain.

3. A connector for attachment between a cross chain and a side wall chain of an anti-skid unit, comprising an elongated body formed at one end for attachment to the side wall chain, said body at its other end having a first relatively wide head adapted for extension through an end link of the cross chain, said head terminating at one end in a nose and at its other end in a tip which is directed toward the cross chain and spaced from the body of the connector to form a link receiving recess, said head being of such length that when the end link of the cross chain is engaged in said recess the said nose of the connector will extend over and rest upon the top of a link of the cross chain, said body being torsionally twisted between the head and the end remote therefrom to dispose the plane of the head oblique to the plane of that end which is to be attached to the side wall chain and said nose being laterally turned to position its tip in the plane of the said end of the body which is to be attached to the side wall chain.

4. A connector for coupling an end of a cross chain to a side wall chain of an anti-skid unit, comprising an elongated body having a slight longitudinal curvature and terminating at one end in an eye by which it is attached to said side wall chain, said body at its other end having a relatively wide flat head extending longitudinally of the body, the body being torsionally twisted between the head and eye to dispose the plane of the head oblique to the plane of the eye, said head at the end adjacent the eye having a tip spaced from the body to form a recess to receive the end link of the cross chain, the recess having a depth less than the diameter of the bar of the link, a nose forming a longitudinal continuation of the head at the other end and being substantially in alinement with said tip, said head being of a length whereby when it is disposed longitudinally in the end link of a cross chain with said tip extending across an end of such link, the said nose will extend over and rest upon the adjacent end of the second link of the cross chain.

5. A connector for joining together a tire cross chain and a side wall chain of an anti-skid unit, comprising an elongated body having an eye at one end for connection with a link of a cross chain, said body at the opposite end being of increased width and flat to form an elongated head extending longitudinally of the body, the width of said head being greater than half the length of the interior of a link of the cross chain through which the head is adapted to be extended, the head at the end nearest said eye being formed to provide a longitudinally directed tip spaced from the body portion and forming therewith a shallow recess for the reception of an end of a link of the cross chain in which the head is adapted to be longitudinally disposed, the end of the head remote from said tip being extended to form a nose portion which is offset with respect to the length of the body, the length of the head from the bottom of said recess to the end of the nose being such as to facilitate the engagement of the nose over the top of a link of the cross chain adjacent one end of the latter while the remote end of said last link is engaged in said recess.

EUGENE T. OPPERMAN.